United States Patent

Shifrin

[15] 3,689,158
[45] Sept. 5, 1972

[54] ATOMIC ABSORPTION ANALYZER COMPENSATED FOR BACKGROUND ABSORPTION

[72] Inventor: Norman Shifrin, Brea, Calif.
[73] Assignee: Beckman Instruments, Inc.,
[22] Filed: Feb. 16, 1971
[21] Appl. No.: 115,311

[52] U.S. Cl. ...................356/87, 250/226, 356/88, 356/93
[51] Int. Cl. .............................G01j 3/30, G01j 3/42
[58] Field of Search..........356/87, 88, 93, 94, 96, 97; 250/226

[56] References Cited

UNITED STATES PATENTS

| | | |
|---|---|---|
| 3,137,758 | 6/1964 | Mason et al. .................356/87 |
| 3,590,255 | 2/1969 | Smith, Jr. et al.............356/87 |

OTHER PUBLICATIONS

Koirtyohann & Pickett, 37 Analytical Chemistry, 601–603, April 1965
Winefordner & Veillon, 36 Analytical Chemistry, 943–944, April 1964
Atomic–Absorption Spectroscopy, Ramirez-Munoz; Elsevier Pub Co, New York, 1968

Fisher Scientific Co., Bulletin    157 entitled " The Jarrell–Ash 800 Atomic Absorption Spectrometer"

*Primary Examiner*—Ronald L. Wibert
*Assistant Examiner*—V. P. McGraw
*Attorney*—Paul R. Harder and Robert J. Steinmeyer

[57] ABSTRACT

There is disclosed an atomic absorption analyzer which provides automatic background absorption compensation. Pulses of radiant energy from a continuous radiant energy source and a resonant frequency source are both directed alternately along sample and reference beam paths. The detector signal is sorted and handled to provide a signal which is (log PR − log PS) − (log AR − log AS) where PR is proportional to the resonant radiation passing the reference path, PS is proportional to the resonant radiation passing the sample path, AR is proportional to the auxiliary radiation passing the reference path, and AS is proportional to the auxiliary radiation passing the sample path. The function log PR − log PS is a function of the total absorbance in the sample path while log AR − log AS is a function of the background absorbance in the sample path. The resulting signal is therefore proportional only to the free atom absorbance of the element of interest.

5 Claims, 4 Drawing Figures

PATENTED SEP 5 1972  3,689,158

INVENTOR.
NORMAN SHIFRIN
BY
Paul R. Harder
ATTORNEY

ATOMIC ABSORPTION ANALYZER COMPENSATED FOR BACKGROUND ABSORPTION

This invention relates to radiant energy analysis and more particularly to a radiant energy analyzer for atomic absorption analysis which is automatically compensated for background absorption.

Atomic absorption spectroscopy has become increasingly utilized in the identification and study of various elements in recent years. The number of elements which can be determined by atomic absorption has grown rapidly although the method was initially confined to but a few elements. In the case of certain elements the atomic absorption process has greater advantage, increased sensitivity and relatively greater specificity over other methods of element determination.

In the atomic absorption process an atomic vapor containing free atoms of the element to be detected is generated. If the free atoms of the element are in the ground state and are illuminated by a light source that radiates light containing wavelengths corresponding to the lines of the atomic absorption spectrum of the element, the neutral free atoms of the element absorb radiation at these wavelengths. If this absorption is measured both qualitative and quantitative determinations concerning the element can be made.

It has been the practice in the past to generate the atomic vapor containing free atoms of the element to be detected in the ground state by aspirating the sample into a flame. The vapor is illuminated by an appropriate light beam, generally by a hallow cathode lamp having a cathode formed of or containing the element or elements to be detected. If proper conditions are chosen, the emission of a hollow cathode lamp consists of a steady, intense and stable atomic spectrum of the element or elements forming the cathode. This spectrum is generally one of very narrow lines normally one of which is at the resonant frequency of the ground state atoms. If now the resonant frequency line is selected by a suitable wavelength selection device, such, for example, as a prism or grating monochromator and the amount of absorption measured, both the presence and concentration of the element can be determined.

It has been recognized that other absorptions at the resonant frequency affect the accuracy of atomic absorption measurements since the total decrease in intensity of the radiation at the resonant frequency or total absorption is measured. These undesired actual or apparent absorptions, herein referred collectively to as "background absorption," are due to such things as molecular absorption (rather than absorption by the free atoms of the elements of interest), absorption by the solvent, matrix salt absorption and instability of the emission of the resonant frequency utilized in the measurement from the radiation source. Another mechanism of "background absorption" which results in an apparent decrease in the intensity of the resonant frequency reaching the detector is due to scattering of the measured resonant frequency radiation by salt particles which are present within the flame. Although emission instability of the measured resonant frequency from the source may be compensated by standard double beam photometric techniques, i.e. passing the measured resonant frequency along a reference path which does not contain the flame and ratioing the intensity of the sample beam to that in the reference beam, the use of standard double beam techniques does not provide adequate compensation for the other background absorption factors mentioned above.

Accordingly it is a principal object of this invention to provide a radiant energy analyzer of the type particularly adapted for atomic absorption analysis and which provides automatic compensation for background absorption.

It is a particular object of this invention to provide an atomic absorption analyzer which provides a measure of background absorption such that the absorption of the free atoms of the element to be analyzed may be more accurately determined.

A further object is the provision of a double beam atomic absorption analyzer having both wide band and resonance frequency radiation passing both beams and combining all radiation at a single detector with provision for signal handling means to develop a signal proportional only to the absorbance of the free atoms of the element to be analyzed.

Other objects and many of the attendant advantages of this invention will be more readily understood by those skilled in the art as the same becomes better understood by reference to the following detailed description when considered in connection with the accompanying drawing and wherein.

Figure 1B:
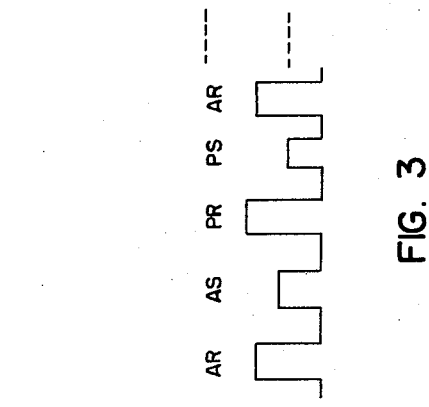
FIG. 1a and 1b are graphs of relative intensity versus bandwidth of the primary and auxiliary radiation at the detector.
Figure 1A:
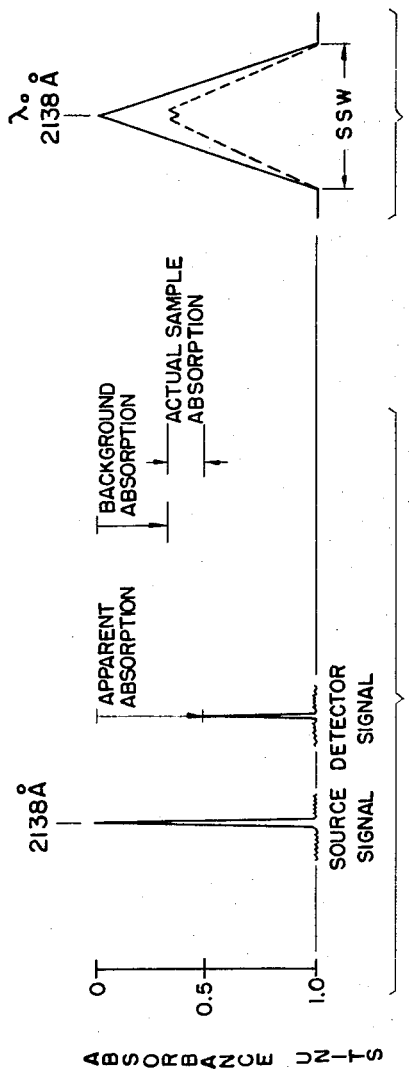

Referring now to FIG. 1a there is illustrated the 2,138 A. resonant frequency line of a Zn hollow cathode lamp, the intensity of a hollow lamp at this frequency being assigned a value on the relative scale of 100. Assume that, as illustrated in FIG. 1a the apparent or total absorption is 0.5 Absorbance Units (AU). However, if it is assumed that background absorption contributes 0.4 AU of the apparent absorption, then the actual sample absorbance, i.e. the absorption by the free atoms of Zn in the sample, is only 0.1 AU. The relative amount of background absorption to apparent absorption will vary from sample to sample and the ratio of 0.4 to 0.1 AU is utilized here as illustrative only.

Monochromators, both grating and prism, are commonly utilized as wavelength selection devices in atomic absorption spectrophotometers. If the nominal wavelength $\lambda_0$ of the monochromator is set to coincide with the 2,138 A. resonance line of Zn and one examines the slit function it will have a triangular shape and a spectral slit width (SSW) which is wide compared to the bandwidth of the hollow cathode lamp line at 2,138 A. The solid line in FIG. 1b illustrates the slit function of a continuum source, i.e. one having all wavelengths in the region of interest, with the nominal wavelength of the monochromator set at 2,138 A. and the intensity of the source at this wavelength being identical to that of the hollow cathode lamp as illustrated in FIG. 1a. If radiation from this continuous source is passed through the same sample utilized in FIG. 1a, the slit function will appear similar to that illustrated by the dashed line in FIG. 1b since background absorption occurs over the entire spectral slit width. The small indentation at the apex of the slit function illustrated by the dashed line in FIG. 1b is caused by the absorption by the free atoms of the sample occurring only over the very narrow bandwidth of the resonant frequency. The slit function also represents the frequency distribution of the radiation at the radiant energy detector. By measuring the intensity of a continuous source having a bandwidth that is broad compared to, but which includes the resonant frequency which as passed both a reference and sample beam path, a more accurate measure of background absorption may be obtained as more fully described hereinafter.

Figure 2:
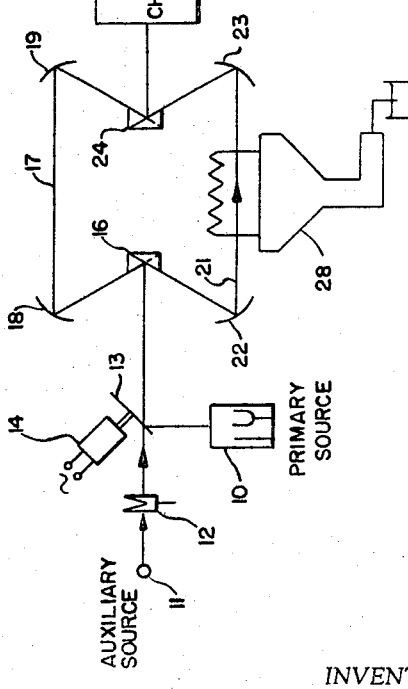
FIG. 2 is a schematic diagram of an atomic absorption analyzer constructed in accordance with the teaching of this invention.

Referring now to FIG. 2 there is illustrated a radiant energy analyzer of the type particularly adapted for atomic absorption analysis and which is automatically compensated for background absorption based upon the principles discussed in connection with FIGS. 1a and 1b above. In the analyzer, primary source 10 provides radiation at the resonant frequency or frequencies of the element to be analyzed. This source will be typically an electrodeless discharge lamp, a hollow cathode lamp having a cathode of the element to be analyzed or, as is common in the art, a multi-element lamp, the primary resonant frequency being selected by the wave selection device as hereinafter described. An auxiliary source 11 provides continuous radiation at least over a bandwidth that is broad compared to the primary source radiation and which includes the primary resonant wavelength to be utilized. The auxiliary source may be any broad band source such as a common filament lamp, a hydrogen lamp or a high pressure xenon or xenon mercury arc lamp. While only one source has been shown it is common practice to utilize a plurality of sources providing continuous radiation over a wide range of frequencies but in different regions of the spectrum. These sources are utilized alternately and selected by a mirror or other suitable beam directing device or selector.

In the beam path common to the auxiliary source 11 it may be desirable to provide a variable attenuator, such as comb 12, so that the energy from the auxiliary source may be adjusted to substantially equal that from the primary source. Although a balance is not essential to the invention since the ratio of the background absorption to the apparent or total absorption from the auxiliary source will be the same regardless of the intensity of the source, balancing of the energy from the auxiliary source and the primary source is generally desirable in order that the detector and other electronic components are generally held within a reasonable dynamic range. Radiation from the primary and auxiliary source is combined along a common path by a rotating sector mirror 13 driven by any suitable device such as motor 14. Radiation in the common path is redirected by beam splitter 16 along a reference path 17 including fixed mirrors 18 and 19 and a sample path 21 including fixed mirrors 22 and 23. The reference and sample beam paths are recombined by beam recombiner 24 and directed to any suitable wavelength selection device such as monochromator 26 which allows only a selected band of wavelengths to pass to detector 27. Any suitable means of providing an atomic vapor containing free atoms of the element to be analyzed in the ground state is provided in the sample beam path and commonly consists of a burner 28 to provide a flame into which the sample to be analyzed is aspirated.

The beam splitter 16 and the beam recombiner 24 are constructed and arranged such that the common beam path is space shared. Any suitable system of beam modulation may be utilized, the appropriate beam modulation in FIG. 2 being provided by a series of apertures through and mirrored sections on the rotary sector mirror 13. Of course, by other spatial arrangements of the primary and auxiliary sources and the use of various mirrors if required both beams may be reflected from mirrored sectors on the rotary sector mirror or passed through a series of apertures therein.

Figure 3:
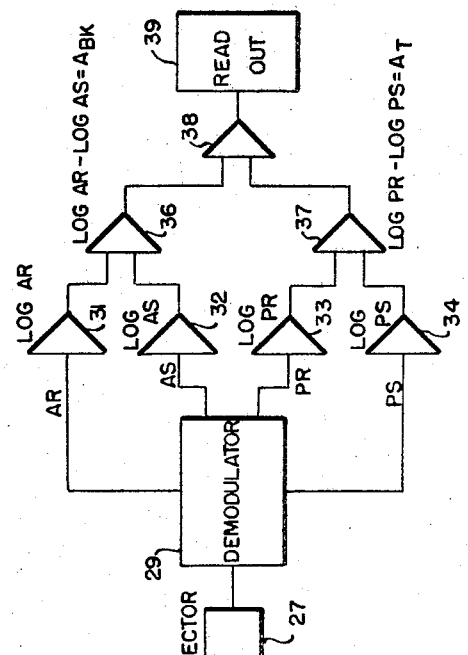
FIG. 3 is a graph of the radiant energy and detector output signals in the analyzer of FIG. 2.

One suitable modulation scheme is illustrated in FIG. 3 and since the electrical output signal of the detector is at least ideally proportional to the instantaneous intensity of radiation impinging upon the detector, FIG. 3 illustrates both the radiant energy signal at the detector and the detector electrical signal output. As illustrated in FIG. 3 both the optical signal and the detector electrical signal output have (i) a component AR which is proportional to the auxiliary source energy passing the reference beam path and contains no background absorption value, (ii) a component AS which is proportional to the auxiliary source energy passing the sample beam path and is equal to the component AR less the total absorption in the sample beam path, i.e., both background absorption and the free atom absorption, (iii) a component PR which is proportional to the resonant frequency energy passing the reference beam path and contains no background absorption value, and (iv) a component PS which is proportional to the resonant frequency energy passing the sample beam path and is equal to the component PR less the total absorption in the sample beam path, i.e., both background and free atom absorption.

Returning now to FIG. 1 and to the prior discussion, if the wavelength selection device is a monochromator set at the resonant frequency of interest, say 2,138 A, the slit function is illustrated in FIG. 1b. The spectral slit width is, of course, a function of the slit width, the monochromator focal length and the wavelength $\lambda_0$ selected. In the region where most elements have resonant frequencies commonly used in atomic absorption measurements and for common focal lengths of monochromators and slit widths used in atomic absorption work, a typical spectral slit width is about 7 A. This is broad compared to the 0.3 A. of the typical resonant frequency line of the primary source. Thus, even though the AS component includes the total absorption, i.e. both background and free atom absorption, the free atom absorption is so small when compared to the background absorption that is can be ignored since the background absorption occurs over the entire frequency profile of the slit whereas the free atom absorption occurs only over the very narrow bandwidth of the resonant frequency line. For the values of spectral slit width and resonant frequency profile given above, the maximum theoretical error, even for a highly concentrated, absorbing sample, would be less than 0.5 percent. Accordingly, for practical purposes, the component AS may be considered as being AR, the initial auxiliary source intensity, less only the background absorption.

Since the AS and AR signals contain information related only to background absorption and the PS and PR signals contain information related to the background absorption, by appropriate signal handling circuits a signal can be developed which is related only to free element absorption, the information desired. These signals may be handled in terms of transmittance or absorbance, both of which are related to absorption.

Referring against to FIG. 2 there is illustrated a simple electronic system which may be utilized to obtain a signal related only to the free atom absorption of the element of interest, the signal readout being in terms of the free atom absorbance. The electrical signal from detector 27 is directed to any suitable demodulator 28 operated in synchronism with the beam modulator 13 so as to direct the separate electrical signal components AR, AS, PR, and PS into separate signal channels each containing, respectively, logarithmic amplifiers 31, 32, 33 and 34. The output from each of these amplifiers is a signal proportional to the logarithm of its input. If now the outputs of logarithmic amplifiers 31 and 32 are fed to the input of differential amplifier 36 such that its output is equal to log AR − log AS we now have a signal which is solely a function of background absorbance. Likewise, the outputs of amplifiers 33 and 34 are applied to a second differential amplifier 37 such that its output is equal to log PR − log PS or the total absorbance. If now the signal from amplifier 36 is subtracted from the signal from amplifier 37 in differential amplifier 38 the resultant output is solely a function of the free atom absorbance, the desired unknown. This signal may be applied to any suitable readout device 39 such as a recorder, meter, or analog-to-digital converter which may be scaled to present the true absorbance value or to indicate concentration directly.

It should be apparent that the individual logarithmic amplifiers 31–34 may be replaced by a single logarithmic amplifier interposed between the detector 27 and the demodulator 28 or may be deleted if ratioing logarithmic amplifiers are substituted for the differential amplifiers 36 and 37. Further, since there is a well known relationship between absorbance, transmittance and absorption, it is possible to provide a readout in terms of any of these functions by the use of appropriate signal handling circuits. Although a monochromator has been disclosed as the wavelength selection device any other suitable device for selecting a band of radiation including the resonant frequency which is wide compared to the resonant frequency may be utilized. A narrow bandpass filter is one additional example.

There has been illustrated and described a radiant energy analyzer particularly adapted for atomic absorption analysis which is automatically compensated for background absorption. Obviously other modifications and variations will be apparent to those skilled in the art and the specific embodiment disclosed herein and the modifications thereof are given by way of example only and not by way of limitation.

What is claimed is:

1. A radiant energy analyzer of the type particularly adapted for atomic absorption analysis and compensated for background absorption comprising:

the source of primary resonance radiation of an element to be analyzed;

a source of auxiliary radiation having a bandwidth that is broad compared to said primary resonance source and which includes radiation at the primary resonance wavelength;

a radiant energy detector for producing an electrical signal having an output proportional to the instantaneous intensity impinging thereon;

wavelength selection means positioned between said sources and said detector for selecting a narrow band of wavelength including said primary resonance wavelength;

mean for directing pulses of radiant energy from said auxiliary radiation source and from said primary resonance source alternately along reference and sample beam paths to said detector whereby said detector produces an electrical output signal having a first component AR proportional to the intensity of auxiliary radiation passing said reference beam path, a second component AS proportional to the intensity of auxiliary radiation passing said sample beam path, a third component PR proportional to resonance radiation passing said reference beam path, and a fourth component PS proportional to resonance radiation passing said sample beam path; and electrical circuit means coupled to said detector and producing an electrical signal proportional to log PR − log PS − log AR + log AS whereby said produced electrical signal is proportional to the absorbance of free atoms in the sample beam path having a resonance frequency at the frequency of said resonance wavelength.

2. A radiant energy analyzer of the type particularly adapted for atomic absorption analysis and compensated for background absorption comprising:

a source of primary resonance radiation of an element to be analyzed;

a source of auxiliary radiation having a bandwidth that is broad compared to said primary resonance source and which includes radiation at the primary resonance wavelength;

a radiant energy detector for producing an electrical signal having an amplitude proportional to the instantaneous intensity impinging thereon;

wavelength selection means positioned between said sources and said detector for selecting a narrow band of wavelengths including said primary resonance wavelength;

means for directing pulses of radiation from said auxiliary source and from said primary resonance source alternately along reference and sample beam paths to said detector whereby said detector produces an electrical output signal having a first component proportional to the intensity of auxiliary radiation passing said reference beam path, a second component proportional to the intensity of auxiliary radiation passing said sample beam path a third component proportional to resonant radiation passing said reference beam path and a fourth component proportional to resonance radiation passing said sample beam path;

first electrical circuit means coupled to said detector and receiving said first and second components and producing a first electrical signal related to background absorptions in said sample beam path in the resonant wavelength region;

second electrical circuit means coupled to said detector and receiving said third and fourth components and producing a second electrical signal related to the total absorption in said sample beam path at said resonant wavelength; and third electrical circuit means coupled to said first and second electrical circuit means for producing an electrical output signal related only to the absorption in said sample beam path due to an element to be analyzed.

3. The radiant energy analyzer according to claim 2 wherein said first and second electrical circuit means each include logarithmic amplification means whereby each of said electrical output signal components are converted to logarithmic functions, said first electrical circuit means differencing said first and second components and said second electrical circuit means differencing said third and fourth components.

4. The radiant energy analyzer according to claim 2 wherein said first and second electrical circuit means each include logarithmic differential amplification means.

5. A radiant energy analyzer of the type particularly adapted for atomic absorption analysis and compensated for background absorption comprising:

a source of primary resonance radiation of an element to be analyzed;

a source of auxiliary radiation having a bandwidth that is broad compared to said primary resonance source and which includes radiation at the primary resonant wavelength;

a radiant energy detector for producing an electrical signal having an amplitude proportional to the instantaneous intensity impinging thereon;

wavelength selection means positioned between said sources and said detector for selecting a narrow band of wavelengths including said primary resonant wavelength;

beam modulation means for directing pulses of radiant energy from said auxiliary radiation source and from said primary resonance source alternately along reference and sample beam paths;

beam recombining means for directing radiation from said reference and sample beam paths along a common path to said radiant energy detector whereby said detector produces an electrical output signal having a first component proportional to the intensity of auxiliary radiation passing said reference beam path, a second component proportional to the intensity of auxiliary radiation passing said sample beam path, a third component proportional to resonant radiation passing said reference beam path, and a fourth component proportional to resonant radiation passing said sample beam path;

signal demodulation and logarithmic amplification means producing a first electrical signal which is a logarithmic function of said first component, a second electrical signal which is a logarithmic function of said second component, a third electrical signal which is a logarithmic function of said third component and a fourth electrical signal which is a logarithmic function of said fourth component;

differential amplifier means connected to said demodulation and logarithmic amplification means for receiving at its input said first and second electrical signals and producing a first difference signal proportional to the difference between said first electrical signal and said second electrical signal;

second differential amplifier means connected to said demodulation and logarithmic amplification means and receiving at its inputs said third and fourth electrical signals and producing a second difference signal proportional to the difference between said third electrical signal and said fourth electrical signal;

third differential amplifier means connected to said first and second differential amplifier means and receiving at its input said first and second difference signals and producing at its output a signal proportional to the difference between said second differential signal and said first differential signal thereby to produce an output signal proportional to the absorbance of a sample in said sample beam path due to an element to be analyzed; and readout means coupled to said third differential amplifier means to provide a readout of said output signal.

* * * * *